United States Patent
Dunham et al.

(12) 
(10) Patent No.: US 6,265,082 B1
(45) Date of Patent: Jul. 24, 2001

(54) FIRE RETARDANT COMPOSITIONS AND METHODS FOR THEIR PREPARATION AND USE

(76) Inventors: Kevin L. Dunham, 21 Ash St., Townsend, MA (US) 04169; John C. Tsirovasiles, 14 Kensington Dr., Chelmsford, MA (US) 01824

(*) Notice: Subject to any disclaimer, the term of this patent is extended or adjusted under 35 U.S.C. 154(b) by 0 days.

(21) Appl. No.: 09/289,189

(22) Filed: Apr. 9, 1999

Related U.S. Application Data (60) Provisional application No. 60/081,219, filed on Apr. 9, 1998.

(51) Int. Cl.[7] ................................................. B32B 27/00
(52) U.S. Cl. ........................... 428/500; 428/261; 428/290; 428/349; 428/355 R; 428/483
(58) Field of Search ................................ 428/500, 261, 428/290, 349, 355 R, 483

(56) References Cited

U.S. PATENT DOCUMENTS

| | | | |
|---|---|---|---|
| Re. 32,131 | 4/1986 | Stahl | 428/215 |
| Re. 34,951 | 5/1995 | Slosberg et al. | 428/95 |
| 3,855,277 | 12/1974 | Fox | 260/45.7 |
| 3,914,495 | 10/1975 | Lania et al. | 428/255 |
| 3,928,708 | 12/1975 | Fohlen et al. | 428/412 |
| 3,940,549 | 2/1976 | Whittum et al. | 428/500 |
| 3,948,842 * | 4/1976 | Kraft et al. | 260/29.6 TA |
| 4,007,067 | 2/1977 | Dunning | 156/61 |
| 4,014,839 * | 3/1977 | Kraft et al. | 260/29.6 TA |
| 4,207,374 | 6/1980 | Groff | 428/261 |
| 4,233,358 | 11/1980 | Jones et al. | 428/246 |
| 4,282,283 | 8/1981 | George et al. | 428/228 |
| 4,284,682 | 8/1981 | Tschirch et al. | 428/263 |
| 4,307,149 | 12/1981 | Scott et al. | 428/323 |
| 4,517,235 | 5/1985 | Ungar et al. | 428/148 |
| 4,520,062 | 5/1985 | Ungar et al. | 428/148 |
| 4,522,863 | 6/1985 | Keck et al. | 428/196 |
| 4,576,862 | 3/1986 | Lee et al. | 428/317.7 |
| 4,645,704 | 2/1987 | Hellwig | 428/176 |
| 4,690,859 | 9/1987 | Porter et al. | 428/251 |
| 4,693,920 | 9/1987 | Agarwal et al. | 428/40 |
| 4,693,926 | 9/1987 | Kowalski et al. | 428/204 |
| 4,704,310 | 11/1987 | Tighe et al. | 427/261 |
| 4,707,510 | 11/1987 | Imai et al. | 524/281 |
| 4,727,107 | 2/1988 | McConnell et al. | 524/371 |
| 4,746,565 | 5/1988 | Bafford et al. | 428/251 |
| 4,765,858 | 8/1988 | Vankerckhoven et al. | 156/235 |
| 4,806,185 | 2/1989 | Porter et al. | 156/78 |
| 4,869,953 | 9/1989 | Watson et al. | 428/260 |
| 4,921,756 | 5/1990 | Tolbert et al. | 428/373 |
| 4,927,698 | 5/1990 | Jaco et al. | 428/198 |
| 4,927,709 | 5/1990 | Parker et al. | 428/352 |
| 4,929,494 | 5/1990 | Matsui et al. | 428/286 |
| 4,935,281 | 6/1990 | Tolbert et al. | 428/116 |
| 4,958,485 | 9/1990 | Montgomery et al. | 57/210 |
| 4,994,317 | 2/1991 | Dugan et al. | 428/246 |
| 4,996,099 | 2/1991 | Cooke et al. | 428/245 |
| 5,087,529 | 2/1992 | Engel et al. | 428/552 |
| 5,091,243 | 2/1992 | Tolbert et al. | 428/253 |
| 5,092,904 | 3/1992 | Neely | 8/574 |

(List continued on next page.)

FOREIGN PATENT DOCUMENTS

| | | |
|---|---|---|
| 38 22 088 | 11/1990 | (DE). |
| WO 82/00307 | 2/1982 | (WO). |
| WO 94/20055 | 9/1994 | (WO). |

*Primary Examiner*—Duc Truong
(74) *Attorney, Agent, or Firm*—Foley & Lardner (57) ABSTRACT

A fire retardant composition comprising a cured film, wherein said film is formed from a film-forming composition comprising a curable resin and a fire retardant, the fire retardant being included in an amount from about 5 to about 95 weight percent based on the weight of the cured film, and wherein when the film is adhered to a flexible substrate, the film substantially does not alter the hand of the flexible substrate.

44 Claims, 5 Drawing Sheets

U.S. PATENT DOCUMENTS

| | | | |
|---|---|---|---|
| 5,207,803 | 5/1993 | Holsten et al. | 8/586 |
| 5,283,117 | 2/1994 | Arai et al. | 428/343 |
| 5,336,348 | 8/1994 | Mindler | 156/231 |
| 5,376,208 | 12/1994 | Yao et al. | 156/246 |
| 5,399,418 | 3/1995 | Hartmanns et al. | 428/218 |
| 5,427,589 | 6/1995 | Holsten et al. | 8/586 |
| 5,473,016 | 12/1995 | Fujii et al. | 525/74 |
| 5,486,408 | 1/1996 | Sentendrey | 428/220 |
| 5,540,980 | 7/1996 | Tolbert et al. | 428/215 |
| 5,552,183 | 9/1996 | Killar | 427/271 |
| 5,654,063 | 8/1997 | Kirk et al. | 428/77 |

* cited by examiner

FIG. 9
200 GRM./FR FOIL

FIRE RETARDANT COMPOSITIONS AND METHODS FOR THEIR PREPARATION AND USE

This application claim priority from Provisional Application Ser. No. 60/081,219 filed Apr. 9, 1998, the text of which is incorporated herein by reference in its entirety including the figures.

BACKGROUND OF THE INVENTION

1. Field of the Invention

The present invention relates generally to fire retardant compositions and methods, and more particularly to fire retardant compositions suitable for application to flexible substrates. This invention also relates to laminates comprising such fire retardant compositions and methods for making them.

2. Description of Related Art

Fabrics, leather, synthetic leather, films, foils, paper, and other articles used in applications for aircraft, automotive, hotel, casino and marine as well as other industries are typically required by international governmental bodies to meet one or more often rigorous flammability or fire retardant tests such as FAR 25.853 (a), Appendix F; MVSS 302; NFPA 701; Nord Arch; BS 5852 and others. That is, the material being used inherently must be flame retardant, even before it is manufactured into an article. Many upholstery, covering or other materials inherently are flammable, at least to some extent, and are therefore not capable of passing flammability tests. Accordingly, many materials must be treated in some way with fire retardant chemicals, often in high quantities, in order to meet requirements that they otherwise could not meet.

Fire retardancy can be imparted to materials in several different ways. For example, resinous materials can be reformulated to include one or more fire retardant materials within the structure of the material itself. Reformulation only is appropriate in some situations, and is inapplicable to natural materials such as leather or cotton. Alternately, it is possible to saturate, impregnate or spray coat a material with a liquid fire retardant, and then flash off the liquid or solvent to leave the residual fire retardant. Saturation methods, however, present several disadvantages. For example, with nonporous materials, there might be insufficient uptake of active chemical to provide the desired level of fire retardancy. Porous materials, while being able to absorb the active chemical, could be stiffened by the chemical.

For fabrics where a specific texture is desired for performance or aesthetics (such as a natural or synthetic suede, velour, etc.) the saturant method of incorporating the fire retardant chemical can in some circumstances severely compromise or destroy the surface texture. In addition, impregnation or spray coating processes often do not apply the fire retardant chemicals evenly over the entire surface material being treated, resulting in some areas being overly treated, while other areas have little or no applied fire retardant. This is particularly prevalent in spray coating processes which often are done manually. There can be other drawbacks due to the fire retardant material itself. For example, some fire retardant chemicals that are dissolved in water or a solvent vehicle can become redissolved by water or solvent and hence, the fire retardant properties are not durable. In addition, water-soluble fire retardant chemicals can be leached out during use, thereby resulting in loss of flame retardant properties. Such leaching can also cause detrimental changes in the appearance of the treated article, such as by "chalking" or "blooming" due to migration of chemical to the surface or face either initially or over time. In fact, some flammability tests such as Nord Arch and BS 5852 require testing of subject material after it has been washed. Thus, if fire retardancy is imparted by saturation, there always is the chance that the material will not meet the test specification after it has been washed or otherwise exposed to liquid.

Moreover, there are environmental and practical concerns associated with the use of many solvents or fire retardant chemicals, particularly when coatings are sprayed on. Thus, many impregnating or coating processes have to be conducted under strict regulations to avoid exposure of harmful materials to the operators. Further, setting up a spray coating process line can be time consuming and expensive. Thus, it is impractical to do so to coat only a small amount fabric or other substrate. This practically limits the use of non-fire retardant fabrics where fire retardancy is required.

A resin can be included with the fire retardant and solvent to act as a binder. However, the use of a resin binder can be very detrimental to the "hand" or "drape" of a material into which it has been impregnated. ("Hand" and "drape" are terms commonly used in the fabric industry to describe certain qualitative properties relating to the feel of the material.) This is because the binder will bind or tie individual fibers of the material together, thus turning a fabric that is soft and supple into something resembling paper in stiffness. For example, it has been proposed to heat seal an abrasion resistant polyurethane to the face of a fabric in U.S. Pat. No. 4,284,682. This process may work in certain applications, but not in cases, for example, where the outer surface of the material should not be altered, and where it is desirable to preserve the hand and drape of the material being treated.

In addition, it has been proposed in U.S. Pat. No. 4,806,185 to employ a fire barrier material between a decorative outer upholstery fabric and a filler material (such as a cushion). The fire barrier material of this patent is a woven or nonwoven material made of coated fibrous substances such as glass fibers, carbon fibers, polyaramid, polybenzimidazole, polymeta-phenylene diamine isophthalate or combinations thereof. There is also provided a coating of latex and a heat conductive metal such as aluminum, copper or nickel. Such materials are generally prohibitively bulky such that they cannot be applied to fabrics for which thickness is critical. Further, when applied to many fabrics, such fire retardant barriers will tend to substantially alter the "hand" of the underlying fabric.

The underlying problem therefore, that exists in the art, relates to how to provide fire retardant to materials such as fabrics without deteriorating their properties (surface texture, hand, drape and the like). Methods of the prior art inherently exhibit leaching of solvents and uneven and/or insufficient application (when spray coating is employed) as well as almost always involve an undesirable stiffening of the underlying fabric. In accordance with the present invention, wherein a cured film including a fire retardant is applied to a substrate, the disadvantages associated with spray coating as well as the undesirable stiffening of the substrate are eliminated.

SUMMARY OF THE INVENTION

It is therefore an object of certain embodiments of the present invention to provide fire retardant compositions in film form that are capable of being applied to flexible substrates. It further is an object of certain embodiments to provide a fire retardant composition that easily can be applied to the underside of flexible substrates as a film using a lamination process. Another object of certain embodiments of this invention is to provide fire retardant laminates comprising the fire retardant films of this invention. Other embodiments of this invention provide methods for preparing and using such films and laminates.

In accordance with these and other objectives, embodiments of the present invention provide a fire retardant composition consisting of a cured film, wherein the film is formed from a film-forming composition comprising a curable resin and at least one fire retardant, the fire retardant being included in an amount from about 5 to about 95 percent by weight based on the weight of the cured film, and wherein, when the film is adhered to a flexible substrate, the film substantially does not alter the hand of the flexible substrate.

Additional objects, features, embodiments and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claim.

BRIEF DESCRIPTION OF THE DRAWINGS

The accompanying drawings, which are incorporated in and constitute a part of the specification, illustrate presently preferred embodiments of the invention, and, together with the general description given above and the detailed description of the preferred embodiment given below, serve to explain the principles of the invention.

DETAILED DESCRIPTION OF A PREFERRED EMBODIMENT

In connection with this invention, unless otherwise indicated, the terms "film" and "cured film" shall mean a dried and/or cross-linked resin, e.g., a resin that includes substantially no liquid component. Embodiments of this invention provide a durable fire retardant cured film that is preferably capable of being applied to the back (often nondecorative) side of a substrate with a minimum of penetration. Such films (which also may be referred to as "foils" by skilled artisans) have advantages over saturants, impregnants, and spray or wet coatings, inter alia, in that the films suitably can be applied to the back side of a flexible substrate as a dry film. Thus, a film composition in accordance with the present invention generally will not penetrate through to the face or decorative side thereof. Because the composition of the present invention can be, and preferably is formed prior to lamination to the substrate, its own uniformity of thickness, weight, and density are typically not dependent upon the uniformity of the substrate. The same cannot be said for direct coating methods where coating deposition can be influenced, for example, by the thickness, compressibility, absorption, surface texture, and wettability of the substrate. The present invention therefore has advantages over direct coating methods inter alia, in that the present composition is capable of being applied to a substrate in a dry state. Although the present invention particularly is adapted to be used with flexible substrates, skilled artisans readily will recognize application of such films with inflexible substrates as well. For such applications, the fire retardant films may be made less flexible and even can be fairly rigid.

Any film forming polymer or resin can be used in connection with the present invention. In selecting suitable polymers, one would look inter alia, to the viscosity, modulus and/or glass transition temperature (Tg) needed to form a film of the desired thickness, elasticity, softness and/or stickiness. Resultant cured coatings are capabale of being removed from the carrier upon which they are formed as one piece and can be handled as a film during further processing steps, if desired. Suitable resins exhibit desirable percent elongation properties, provide sufficient wet adhesion during formation of the film, as well as provide adequate strength for use as a film. A suitable film can have a 100% modulus in an uncrosslinked state between 20 and 5000 psi, a 100% modulus between 30 and 2000 psi, and between 30 and 1500 psi also provides acceptable results in some applications. Suitable viscosity ranges for uncured resins of the present invention in some embodiments range from 500 to 100,000 cps, ranges between 500 and 50,000 cps may also provide acceptable results. For some resins, a suitable glass transition temperature ranges from −30 to 40 degrees C., more preferably between −20 to 20, and most preferably between −20 and 10. It is an advantage of the present invention that in some instances, the modulus of the uncrosslinked resin, as well as the modulus and/or glass transition temperature of the resin is not critical since processing parameters can be easily adapted to accommodate different materials. It is critical only that the underlying resin be capable of forming a film.

Desirable properties of the underlying resin should take into account the affect additional flame retardants and other auxiliaries being added thereto will have on the resultant cured film. As mentioned above, typically the resin should be formulated to be soft, but not tacky or adhesive when cured. However, under some circumstances a tacky resin may be desirable. The skilled artisan will be able to adjust the properties of the resin depending upon the inherent properties of the underlying resin and the amount of fire retardant and optionally addition fillers necessary to achieve the desired flame retardancy.

Suitable films generally will be capable of being added as a film backing to flexible substrates, such as fabrics, without substantially changing the hand or feel of the substrate itself. That is, after the cured film is applied to the substrate, the substrate still should substantially maintain its underlying physical properties in terms of drape, stiffness, softness, flexibility, elongation, stretchability, and the like, as compared with other processes (such as direct coating). For example, it is preferable that the pliability or stiffness of the substrate being treated be substantially the same with or without the fire resistant film applied thereto. In this regard, it is preferred that the pliability of a film coated substrate as measured in ASTM D747 "Stiffness of Plastics" or by General Motors Test GM9664P, not vary more than 100%, preferably not more than 75%, more preferably not more than 50% after application of a film of the present invention, more preferably not more than 35%, still more preferably, not more than 25%, even more preferably, not more than 15%, yet still preferably, not more than 10%, most preferably, not more than 5% or even less. In general, therefore, the fire retardant films of this invention will be soft and pliable, but generally not so soft that they have a tacky or adhesive property, unless desired for a particular application. In instances where the resulting product is to be rigid, the fire retardant film may be stiffer or even substantially rigid.

The underlying resin may be soluble or dispersible in aqueous-based or solvent-based systems. The underlying resin may comprise a single resin or a mixture of two or more resins. The resin optionally may be thermosetting, thermoplastic, cross-linking, and also, may be crosslinkable at room temperature, heat curable, or curable by UV or by some other initiator. The film-forming composition may be liquid or solid at ambient temperatures. Films of the present invention may be applied at ambient temperature or at elevated temperature, e.g., over 40 degrees C.

A suitable underlying polymer resin may itself be flammable or nonflammable. Inherently nonflammable resins contain, or are modified to contain elements, such as halogen, phosphorous, large quantities of nitrogen and the like, which render them flame retardant. Such nonflammable resins include polyvinyl chloride, polytetrafluoroethylene, chlorinated polyethylene, polyesters of halogenated anhydrides, high molecular weight halogenated aromatic polycarbonates, chloroprene and the like. Nonflammable resins may be used alone, or may be mixed with a sufficient quantity of other flame retarding agents to increase the flammability thereof.

If a flammable resin is employed, the resin will be mixed with a sufficient amount of one or more flame retardants to render a film of the resin and/or substrate to which it is applied capable of meeting one or more flammability tests. Nonlimiting examples of suitable inherently flammable polymers include polymerization products of vinyl monomers, e.g., vinyl aromatic compounds such as styrene, vinyl toluene, vinyl naphthalene, divinyl benzene, or mixtures thereof; vinyl esters, e.g., vinyl acetate or vinyl butyrate, methylene methyl malonate; a polymerization product of an olefinic monomer, such as ethylene, propylene, 1- and 2- butene, 1-decene, or a diolefin, such as butadiene or isoprene, and the like, including interpolymerization products thereof with vinyl monomers, e.g., butadiene styrene copolymers, and terpolymers with alkeneyl cyanides, e.g., acrylonitrile; a polymerization product of an acrylic or methacrylic monomer, e.g., acrylic acid, methyl acrylate, ethyl acrylate, n-propyl acrylate, iso-propyl acrylate, n-butyl acrylate, t-butyl acrylate, hexyl acrylate and the corresponding alkyl methacrylates; polymerization products of allyl monomers, such as methyl allyl ketone, ethyl vinyl diallyl ether, N-allyl caprolactam, N-allyl acrylamide; a polymerization product of an unsaturated ketone, e.g., methyl vinyl ketone, and the like; a polyamide, such as adipic acid-hexamethylenediamine reaction products; cellulosic esters, such as cellulose acetate, cellulose butyrate, cellulose nitrate; aromatic polycarbonates, such as phosgene-bisphenol-A reaction products; polyphenylene ethers, alone and in combination other resins, polysulfones, polybenzimidazoles; polyesters, such as wholly aromatic polyesters, e.g., hydroquinone-terephthaloyl chloride reactions products; wholly aliphatic polyesters, and poly(alkylenene iso and terephthalates), as well as polyester or polyether copolymerized or otherwise mixed with isocyanates. The foregoing list is merely exemplary and skilled artisans readily will appreciate a wide range of applicable base resins useful in this invention.

Resins of the present invention can be made according to techniques known in the art such as described, for example, in F. Billmeyer, *Textbook of Polymer Science*, 2nd Edition (1971) or J. Brandrup et al., *The Polymer Handbook*, 2nd ed. John Wiley & Sons, (1975).

The manner of adding the flame retardants to the resin is conventional. For example, the flame retardants and other additives can be added directly or as part of a blend premix using an extruder, by fluxing on a mill, or by a paddle or sheer mixer.

In order to impart flammability properties any oxygen scavenger or mixture thereof can be employed. Advantageously, for example, at least one halogenated compound and at least one antimony compound typically are added to the resin, if the resin employed inherently is not flame retardant. Suitable halogenated compounds include decabromodiphenyl ether, decabromodiphenyl oxide, hexabromocyclododecane, decachlorodiphenyl ether, bis(tribromophenoxy)ethane, bis(tribromophenyl)ether, octabromodiphenyl oxide, poly(dibromophenylene oxide) and the like. Alternately, one or more halogens can be incorporated within the resin itself. Suitable antimony compounds include antimony oxide, antimony trioxide, antimony pentoxide and antimony triacetate. The halogenated compounds and antimony compounds in some instances are present in the cured film in a molar ratio of about 3:1–1:3. Other ratios can also be used and could readily be determined by one of skill in the art depending on the application. Skilled artisans also may appreciate other types of fire retardant materials that can be employed in the films of the invention, e.g., char forming agents.

Skilled artisans will recognize that the amount of fire retardant material to be used will be depend upon the particular application of the film contemplated, as well as the underlying resin employed and film properties desired. For example, where high loadings of fire retardants are necessary for a particular use, e.g., to render very flammable material flame retardant, then some base resins (e.g. urethanes) may not be usable because they cannot tolerate such high loadings and be formed in sufficiently heavy films to provide a soft-yet-fire retardant film. In such cases, an acrylic, chloroprene, or other resin may be preferable, especially in instances where a soft film is desired. Skilled artisans will appreciate that some trial and error may be necessary to formulate the desired resin, but only routine experimentation will be necessary to prepare an acceptable film.

It also is possible to incorporate one or more halogens into the resin itself during polymerization or manufacture. In addition, other conventional additives or adjuvants may also be incorporated with the underlying resin to adjust the properties of the cured film. Additional additives that may be added as desired include plasticizers, release agents, stabilizers, modifiers, pigments, dyes, thickeners, diluents, biocides, fungicides, inert fillers, other resins, tackifiers, and the like. Such additives are well known to skilled artisans and can be employed depending on the desired qualities of the film.

In some embodiments, it may be useful to include a smoke suppressant (cooling agent) in the composition such as trihydrated alumina. The smoke suppressant is advantageously included in an amount from 0.5–70%, 5–30%, 10–20% by weight based on the weight of the wet resin before curing. Many smoke suppressants are hydrated compounds. Suitable smoke suppressants include hydrated zinc borate and the like. The addition of a smoke suppressant permits coated materials to meet tests that require smoke suppressant ability such as the IMO 653, for example. When trihydrated alumina is subjected to flame or fire, one by-product is water, thus causing the cooling agent to act as a diluent in vapor phase, which is important to achieve smoke suppressant action. When a certain temperature is reached, (i.e. approximately when the flame reaches 1500° C. and/or when the smoke suppressant reaches approximately 280–300° C.) the loosely attached water portion of the molecule comes off, thus, (i) the smoke suppressant acts as a diluent in vapor phase, (ii) acts as a cooling agent, and (iii) changes the rate of heat release because the smoke suppressant/cooling agent will absorb heat in gaseous phase, since it takes some heat out of the vapor. As such, the inclusion of a cooling agent in a coating composition helps materials or fabrics pass rate of heat release test such as IMO 653.

Therefore, the addition of any material that acts as a diluent in the vapor phase will be suitable to include as a cooling agent if the same is needed for any reason, such as to pass tests such as IMO 653 that have standards as to smoke toxicity and/or smoke density.

In particularly preferred embodiments of the present invention, the resin employed is a fully compounded latex acrylic polymer that includes decabromodiphenyl oxide and antimony oxide such as that sold as 004156 by Heveatex Corporation. Suitable materials that include a smoke suppressant include Heveatex 004158, that includes antimony, a halogenated compound, and trihydrated alumina (18.5% by weight). Other suitable resins or resin compositions having acceptable fire retardant properties include #103FR sold by T. H. Glennon Co., Inc. and Vultex BMD-168 sold by General Latex. Alternately, the resins could be mixed with the desired amount of flame retardant and used in certain applications. For example, HYCAR® 26345, HYCAR® 26171, VYCAR™ 590X20, VYCAR™ 460X46, VYCAR™ FT-9, all of which are sold by B.F. Goodrich, as well as many other film forming resins are acceptable in certain applications.

The resultant cured film of the present invention preferably should be capable of meeting one or more flammability tests. In order to incorporate the desired degree of flammability, in some embodiments it is advantageous that the resin contain flame retardants or have an inherent flame retardant component included in an amount between 5 and 95% by weight based on the total weight of solids in the film, in some embodiments between 20 and 80%, between 35 and 75% by weight, between 50 and 75%, and even between 55 and 70%, depending on the application. Uncured films having solid contents up to 100% solids will achieve acceptable results in some applications. The solid content will typically range between 30 and 80% of the weight of the total, or between 40 and 70%. In instances where a soft film is desired, an acceptable film will be capable of taking the desired amount of flame retardant, while still maintaining the softness and pliability properties of the film.

Cured films of the present invention advantageously can be formed at weights of 10–1000 grams per square meter of the cured film, more commonly at 40–500 grams per square meter, and in many cases between 50 and 200 grams per square meter, and weights between 75 and 200 grams per square meter or 100–150 grams per square meter are particularly advantageous for nylon-based materials such as microfiber materials and synthetic leathers.

The density of the resin may be modified, for example, by the addition of air or chemical blowing agent such as by foaming or frothing for particular applications. The density of the cured resin if the underlying resin is foamed or frothed might typically change by a factor of 2 or 3 or more.

Suitable resins also should be capable of forming a film that preferably ranges from 0.5 mil to 30 mil, more preferably from 1 to 10 mil on at least one side of a flexible substrate, preferably on a rear face thereof. For example, advantageous ranges include 1–3, 3–5, 5–7 and 7–10 mils. A particularly advantageous range is from 2–5 mils for some applications. The film may be formed directly by applying it to a continuous belt on which it is cured. It then can be separated and stored as an elongated web, e.g., in a roll of from 10, 25, 50, 100, 200 or more meters. Alternatively, the film can be formed on a separate carrier and then separated, either before or after the film is applied to a substrate. The film prepared on a carrier could be stored as a roll, in sheet form, or in any convenient form, with or without a carrier, in lengths of 10, 25, 50, 100, 200 or more meters in length. Any continuous web material capable of holding the flame retardant compound and releasing it during a transfer coating process can be used as a carrier for the film. Nonlimiting examples of the carrier include paper, polymeric films or foils, metallic films or foils, textiles. The carrier may be smooth or textured depending on the desired properties of the resultant flame retardant film such as surface area, tactile feel, elongation, flexibility, tensile strength, tear resistance, electrical conductivity, moisture vapor transmission, and water repellency. In preferred embodiments of the present invention, films are formed on any releasible substrate, for example, on a release paper that is coated for example with a release agent such as silicone, polypropylene or other release agent. In some instances, it may be useful to use matte or gloss release sheets, or papers that would impart a specific grain on the resultant film.

Additionally, it is possible to include layers other than films, such as knits, reinforcing materials, scrims or the like. Such materials can be a discrete layer of a laminate or alternatively can be incorporated into the wet fire retardant resin film before curing to provide a reinforced, fire retardant film. In the case that the reinforcing material is employed, such reinforcing material would act merely as carrier for the film and as such, would preferably have no fire retardant properties associated with the carrier per se. That is, the carrier, if employed, would preferably not function as a fire barrier to any substantial degree.

Films prepared according to the present invention may be made using any known technique. One particularly preferred method for forming the instant films is using a knife-over-roll coater. Alternately, films of the present invention can be formed using reverse-roll coating. Coating may be accomplished by floating knife, knife over roll, reverse roll coater, spray, etched or engraved roller coating, powder coating, extrusion, and the like. Coating line equipment is easily obtainable, for example, from Schmid of Switzerland or Isotex of Italy. Advantageously coating equipment used to make the present films would include a meter, for example, a radioactive beta gauge, for monitoring the thickness or mass of the film as it is formed.

Skilled artisans readily will recognize that compositions of the present invention can include multiple layers of films, which may be the same or different. For example, a film having dry and rigid properties first could be formed on a textured or embossed release sheet so that the more rigid dry film is made to form within grooves formed in the paper. A less rigid elongation promoting film then could be formed over the first film to provide a film composition with variable properties over the extent of the surface. The film formed then could have islands (discontinuous portions) of a dry resin surrounded by a continuous elongated film. Alternately, the elongated film could be formed first in the embossed portions which could be surrounded, for example, by a stiffer film. In some cases, the most efficient fire retardant composition may be too soft to be functional as a single coat; thus a second and less tacky resin could be applied initially to the paper so that the film could be readily handled. Two or more layers of film could be formed to prepare useful films, as long as at least one layer is fire retardant. The thicknesses, compositions and weights of each layer could be the same or different. Each layer of film could also be tinted or dyed with the same or different colors which might be used to designate the composition of the film, its thickness or weight.

As mentioned above, the cured film, in an elongated form and with or without a release sheet could be packaged, for example, in sheet form or roll form. If a release sheet is used to form the film, the release sheet first could be removed using a conventional uptake roll, and then the resultant film could be rolled, webbed, sheeted or otherwise put into a transportable form. Alternately, the film and release sheet could be packaged together in any transportable form, for example, in a roll.

Alternately, the film can be provided with an adhesive. Suitable adhesives may be continuous or discontinuous. However, most advantageously adhesives applied to the film are discontinuous. That is because a discontinuous adhesive permits the film to be applied to flexible substrates with minimal affect to the properties of the underlying substrate, such as hand and/or drape. That is, by using a discontinuous adhesive, fewer fibers of the substrate are taken up by the adhesive, thereby permitting the hand or drape of the substrate to be maintained. Adhesives that can be used in accordance with the present invention include thermoplastic adhesives, cross-linkable adhesives where crosslinking or polymerization is activated and accomplished by heat, UV or otherwise thermosetting adhesives, pressure sensitive adhesives, other curable adhesives, ultrasonically cured adhesives, solvent-based contact adhesives and the like. Alternately, the fire retardant film itself may serve as an adhesive, such as in the case of heat sealable films, or films to be used in applications where adhesive properties are desired.

One particularly advantageous adhesive is a thermoplastic web adhesive such as that manufactured by Spunfab Adhesive Products of Cuyahoga Falls, Ohio.

Films of the present invention can be applied to any flexible substrate. Nonlimiting examples of suitable substrates include any fabric or textile, natural or synthetic leather, coated fabrics, paper products, nylons, sheer materials, silks, satins, synthetic suede, velour, polymeric films or foils and the like. The present composition is particularly adapted to be applied to fine fabrics where the hand and drape of the resulting product are important and the desired product is one where the hand and drape of the resulting product are substantially unchanged from the hand and drape of the uncoated substrate.

Films of the present invention preferably are applied to flexible substrates using conventional lamination processes using conventional equipment, such as that manufactured by Kannegeisser of Germany or Sun Brand of Atlanta, Ga. Flat bed laminators prove particularly suitable, but the use of hot irons in general is contemplated. Skilled artisans thus will appreciate that films of the present invention can be used, e.g. by themselves or with a release backing, to efficiently and economically coat substrates of any length. Thus, fabrics as short as 5 to 10 meters in length can be quickly and easily rendered flame retardant. This invention thus enables use of many non-flame retardant fabrics for flame-retardant applications. Of course, applications to fabrics and other substrates in lengths of 25, 50, 100, 200 meters and much longer are contemplated, and indeed, will be common.

Embodiments of the invention are described in connection with the figures, which form part of the description of this invention. The dimensions of the figures shown herein are not drawn to scale. A suitable technique for lamination is exemplified in FIG. 1. The film 10 would be fed from a roll, while the substrate to be coated 12 is fed concurrently. The film 10 and substrate 12 are brought together at 14, for example over a hot oil drum, for a temperature and time to cause the film to adhere to the substrate. If the film has already been coated with an adhesive, the film could be directly laminated to a flexible substrate. If the film has not already been treated with an adhesive, then an adhesive can be introduced prior to and/or at 14, if needed. The temperature of the lamination should be adjusted based on the activation temperature of the adhesive (if a heat activated adhesive is employed). Advantageously, the heat, pressure and residence time are carefully controlled to achieve best results. Subjecting the laminate to a second round of heat and pressure also may be desirable. A calendering or embossing roll or the like can be used to apply pressure if needed to produce a laminate. The laminate is rolled onto a uptake roll 20 for further use.

Figure 1:
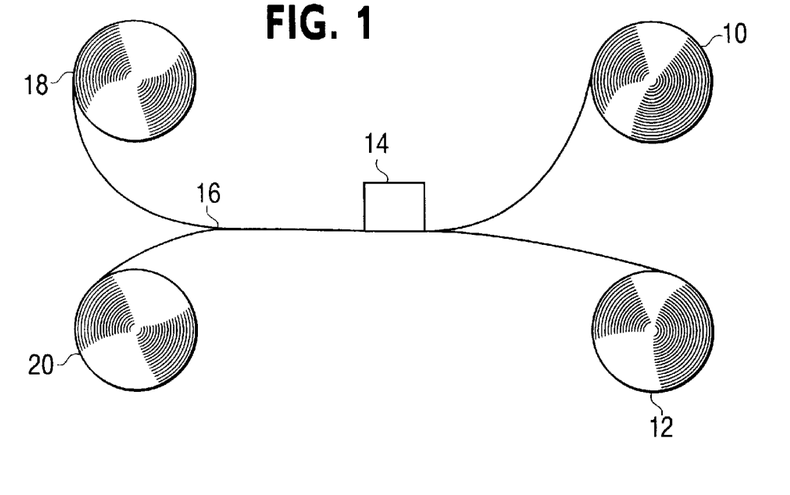
FIG. 1 is a schematic diagram of a method of preparing a film or coated substrate in accordance with the present invention.
Figure 2:
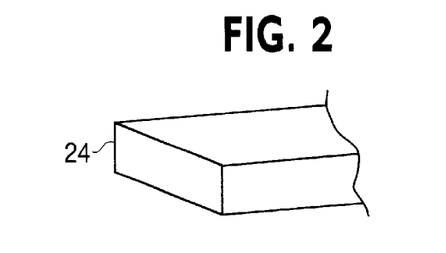
FIG. 2 is a film in accordance with the present invention.

Should there be a need for additional layers, the described apparatus can be easily adapted to permit such further layers to be fed into the lamination either concurrently or at any point in the process. If the film 10 being fed is provided with a release backing, the release backing could optionally be removed at 16 and uptaken separately as shown at 18.

Figure 3:
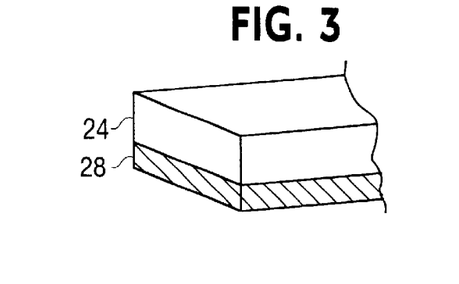
FIG. 3 is a film and release backing in accordance with the present invention.
Figure 4:
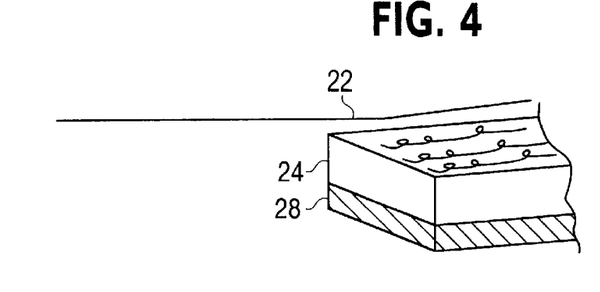
FIG. 4 is a film, release backing, and adhesive in accordance with the present invention.
Figure 5:
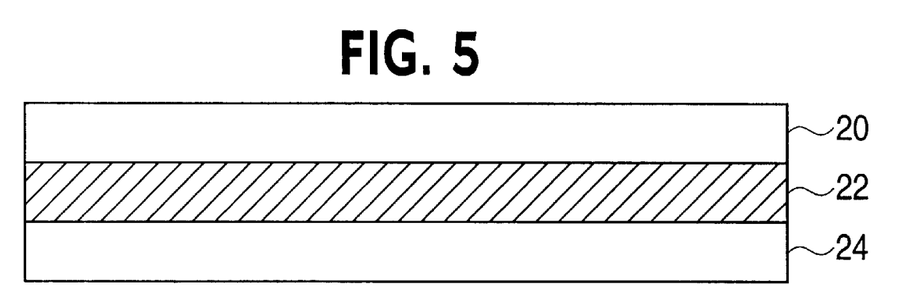
FIG. 5 is a laminate in accordance with the present invention.
Figure 6:
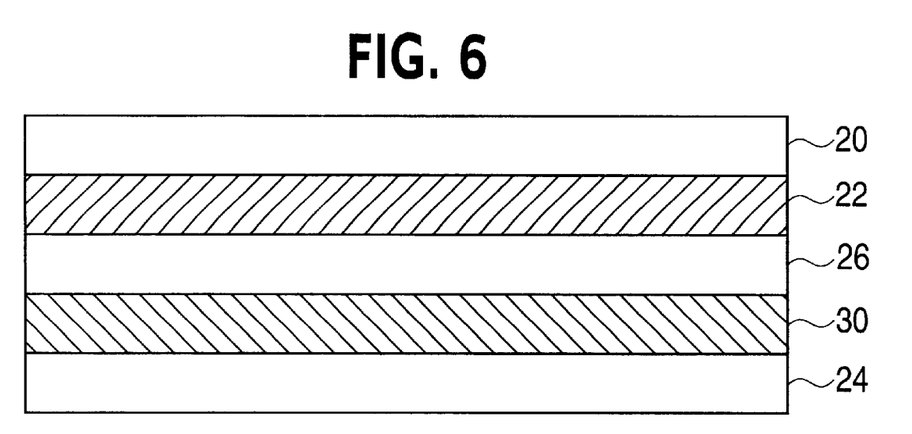
FIG. 6 is a laminate in accordance with the present invention.

In FIGS. 2–6,there are shown illustrative laminates in according to the present invention. The film generally is shown as 24 in FIG. 2. FIG. 3 shows a film 24 adjacent to a removable release layer 28. As shown in FIG. 4, a film 24 is adjacent to a removable release layer 28. On the opposite side of the film 24,there is an adhesive 22. In FIG. 5, a film 24 laminated to a substrate 20 by an adhesive 22 is shown. FIG. 6 illustrates a layered article with a film 24 provided adjacent to an optional adhesive layer 22. Adjacent to the adhesive 22, there is shown an optional reinforcing layer 26, attached to a substrate 20 by another adhesive 30 that may be the same or different than adhesive 22. There could optionally be provided one or more further layers of reinforcing material with or without additional adhesive layers at any point between the film 24 and substrate 20.

Of course there also optionally could be two or even more film layers in any of the above embodiments, one or more of which is fire retardant. For example, as described above, one film could be continuous while the other film layer is discontinuous.

Laminates of the present invention may be composed of one or more different materials applied in layers. The layers may designed in composition, thickness and pattern to act as a retardant, an adhesive, a reinforcement, and/or as a modifier to other physical or chemical properties on the film. As mentioned above, the film may be continuous or discontinuous.

Films of this invention, after being cured, preferably can be applied to substrates without the evolution of volatiles or solvents to capture, recycle, or incinerate. In addition, the present films of this invention suitably can be applied to substrates that otherwise would be difficult to coat via a direct wet coating method, such as very open weave materials, or those that are prone to shrinkage, discoloration etc., by contact with water or solvents. Such films can be laminated to a substrate with conventional laminating equipment or simply with a hot iron. It is ideal for small lots of substrate or for irregular shapes such as leather hides. Such films can be stored on the shelf and only the amount necessary for the lamination can be used. There are no complicated and expensive set-ups for coating or spraying machines, and the clean-up, if any, is minimal.

For a given combination of substrate and fire retardant formulation, there typically will be a minimum amount of the fire retardant which will need to be applied to obtain a satisfactory level of performance. With a given weight of fire retardant formulation, formed into a film by the process outlined and laminating it to the substrate, a product will result which has a softer hand or drape that the identical amount of the same formulation applied by direct wet or spray coating method. This is because, inter alia, the latter process will have more penetration of the fire retardant product into the substrate with a corresponding binding and adhesion of fibers together.

Films of the present invention are adapted to completely or partially cover one side of the substrate with substantially no protrusion of the substrate fibers through the back surface of the substrate. While not being bound to any particular theory, it is believed that the instant film, when applied according to the present invention, serves as a barrier when the substrate is exposed to a flame during a horizontal or vertical burn test or in an actual fire situation. The instant film substantially maintains its film properties when exposed to an open flame, thereby lowering the burn rate of the substrate to which is it adhered. As the film is consumed by the flame, it is believed that gasses produced rise up through the active burning zone, scavenging oxygen and extinguishing the flame. This property results in improved performance from the film lamination process of the invention compared to an equivalent formulation coated by an direct wet coating process.

It may be desirable in some circumstances to pass what are known as "composite tests," which measure weight loss to measure compliance. To pass composite tests, it is known to wrap the component sought to be protected (such as the foam of a chair cushion) with a barrier layer to protect the article (such as a foam), with a barrier material, i.e. glass woven fabrics, aramids and/or monoacrylic materials such as those described for example in U.S. Pat. No. 4,806,185 so that the material chars in place, thereby protecting the cushion. A "barrier" means a fire blocker. Essentially a barrier is a material that keeps fire away from foam, but does not relate in anyway to the ability of the material to extinguish a flame. That is, a barrier is a physical protection from fire and flame as opposed to an actual fire retardant.

However, in connection with the present invention, it has been found that oftentimes it is undesirable to include one or more layers of charring fire retardant "barriers." The use of a barrier such as glass fibers or an aramid may permit a component to burn, and may prevent the material from melting away from the test flame and self-extinguishing. As such, the use of a fire barrier in connection with a foil as defined herein may increase after-flame time and char lengths and not permit coated articles to pass vertical component burn tests such as FAR 25.853(a). In a component test, if a strong fire retardant material such as glass fibers or an aramid is included, the fire retardant holds the material in place and lets it burn, and does not permit melting and/or quenching of a fire. It is also advantageous in many instances to expose the fire retardant foil to the outside of the laminate so that when the coated substrate ignites, the exposed fire retardant is the closest to the flame and thus works most efficiently. On the other hand, if the fire retardant layer is sandwiched between an outer layer and an inner layer, then the fire retardant will generally tend riot to function as well.

Moreover, the use of a barrier would also make a coated article too stiff and thereby, tend to substantially alter the "hand" of the material such that a consumer would find the material less desirable for many applications. In addition, relatively thin materials (such as $\frac{1}{16}$ inch or even less) are needed for many fabric applications. This is because many applications employ a track system and if the material is too thick, it won't fit within the track. Therefore for applications employing track systems, there is no tolerance for extra fabric. In addition, many applications for fire retardant fabrics are for coating panels wherein the fabric is adhered to the panel with velcro. In such situations, very close tolerances are required and the total thickness of the fabric (including any coatings) must be 30 mils or less. Most fabrics before being made fire resistant (including those used for panel applications) are typically 25–30 mils in thickness. Therefore, the fire retardant to be coated must often be no greater than 5 mils in thickness to ensure that the fabric plus fire retardant coating are not greater than the 30 mil tolerance required. Furthermore, it is often desirable to provide a fire retardant coating that introduces a high degree of fire retardant without the addition of substantial volume and/or weight. In this regard, a foil in connection with the present invention generally has a weight of 50–200g/sq. meter, whereas a known material such as springs 187 commercially available material is 10 oz./sq. yd. (or approximately 300 g/sq. meter).

EXAMPLE 1

A chloroprene film having a viscosity 20,000, and a modulus (100%) of 30 psi in an uncrosslinked state and including 45% total solids (18% chlorine and 9% antimony, 18% other solids) was formed using a knife-over-roll coating method and two samples were laminated with a flat bed laminator on two identical pieces of polyurethane impregnated nylon fabric (Majilite FINESSE®) at a weight of 50 g/m$^2$. As a control, 50 g/m$^2$ of the same chloroprene resin including the same 45% solids was wet coated on two pieces of the same polyurethane impregnated nylon fabric. When the 4 samples were subjected to the horizontal burn test of MVSS 302, both the laminated samples passed, while only one sample of the wet coated controls passed the test.

EXAMPLE 2

Six films were prepared in the same manner as in example 1, but using an acrylic latex resin having 61% solids, 33.5% by weight based on the weight of the uncured resin was decabromodiphenyl oxide and 6.7% by weight based on the weight of the uncured resin was antimony. The resin had a viscosity of 5000–6500 cps and a glass transition temperature of −20 degrees C. Two films were formed at a weight of 50 g/m$^2$, two at 64 g/m$^2$, and two at 90 g/m$^2$. Each of the six films were laminated to the same polyurethane impregnated nylon fabric (Majilite FINESSE®). As controls, six pieces of the same polyurethane impregnated nylon were wet coated with the same quantities of the same acrylic resin. All 12 samples were subjected to MVSS 302. The results are shown below:

|  | Film | Wet Coat |
|---|---|---|
| 50 g/m² (#1) | fail | fail |
| 50 g/m² (#2) | fail | fail |
| 64 g/m² (#1) | pass | fail |
| 64 g/m² (#2) | fail | fail |
| 90 g/m² (#1) | pass | fail |
| 90 g/m² (#2) | pass | fail |

Based on the foregoing test results, it appears that applying the films of the present invention provide better flame retardant properties than when the same weight of the same resin is applied wet to the same substrate. Moreover, in each instance, the films of the invention substantially did not alter the hand or drape of the underlying fabric, whereas the hand and drape of the wet coated fabrics substantially was altered.

EXAMPLE 3

Acrylic Heveatex 4156 FR waterbase chemical (52% solids) was cast on VLC paper and then combined at the embosser using 300° F./18 ft/min and 60 PSI to numerous fabrics and products. The ratio of the FR foil weight to the fabric (product) weight, the foil index, was used as a study criteria. Below are the findings of this work using flammability test FAA 25.853.A, Appendix F (vertical) as a reference point. This test uses three parameters as its pass/fail criteria, char length, after flame and drip burn. Char length is the length of the sample burned measured in inches. A maximum average (of three samples tested) greater than 8.0 inches constitutes failure. After flame is the amount of time in seconds the sample flames after the test flame has stopped. 15 seconds is the maximum allowable average. Drip burn is the amount of time in seconds a sample flames after dripping. Five seconds is the maximum allowable average.

Findings

A 1:1 foil to product weight ratio was an advantageous loading for polyester fabrics. For acetate fabrics, a foil to product index of 1.0 to 1.4 is advantageous. A foil to product ratio of 1.1 was optimal for acetate/rayon fabrics.

150 g/m² foil (a foil index of 0.5) –200 g/m² foil (a foil index of 0.7 to 0.8) were found to be optimal weight density loadings under some conditions. 100 g/m² foil is also an optimal weight for some applications.

Figure 7:
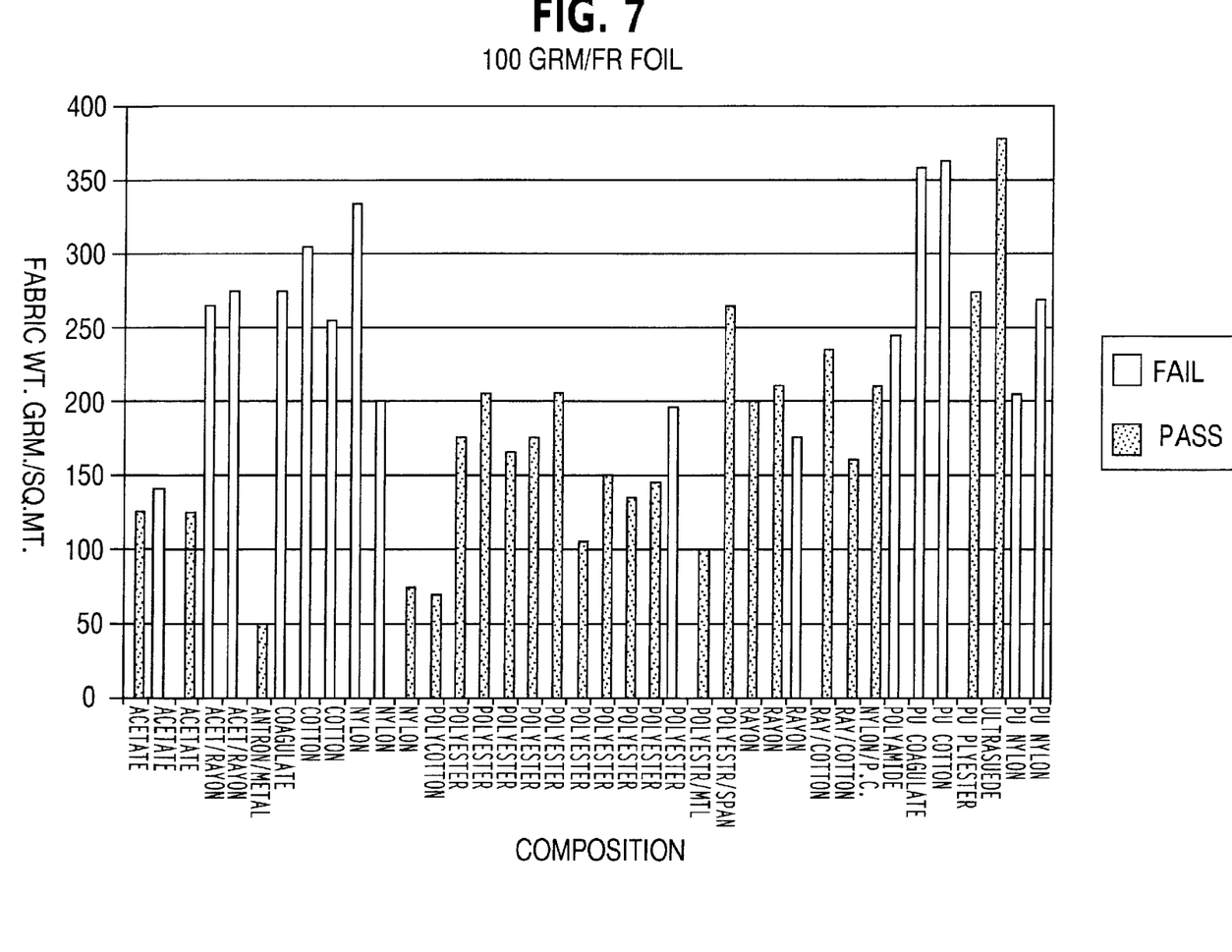
FIGS. 7–9 are bar graphs depicting the results from example 3.
Figure 8:
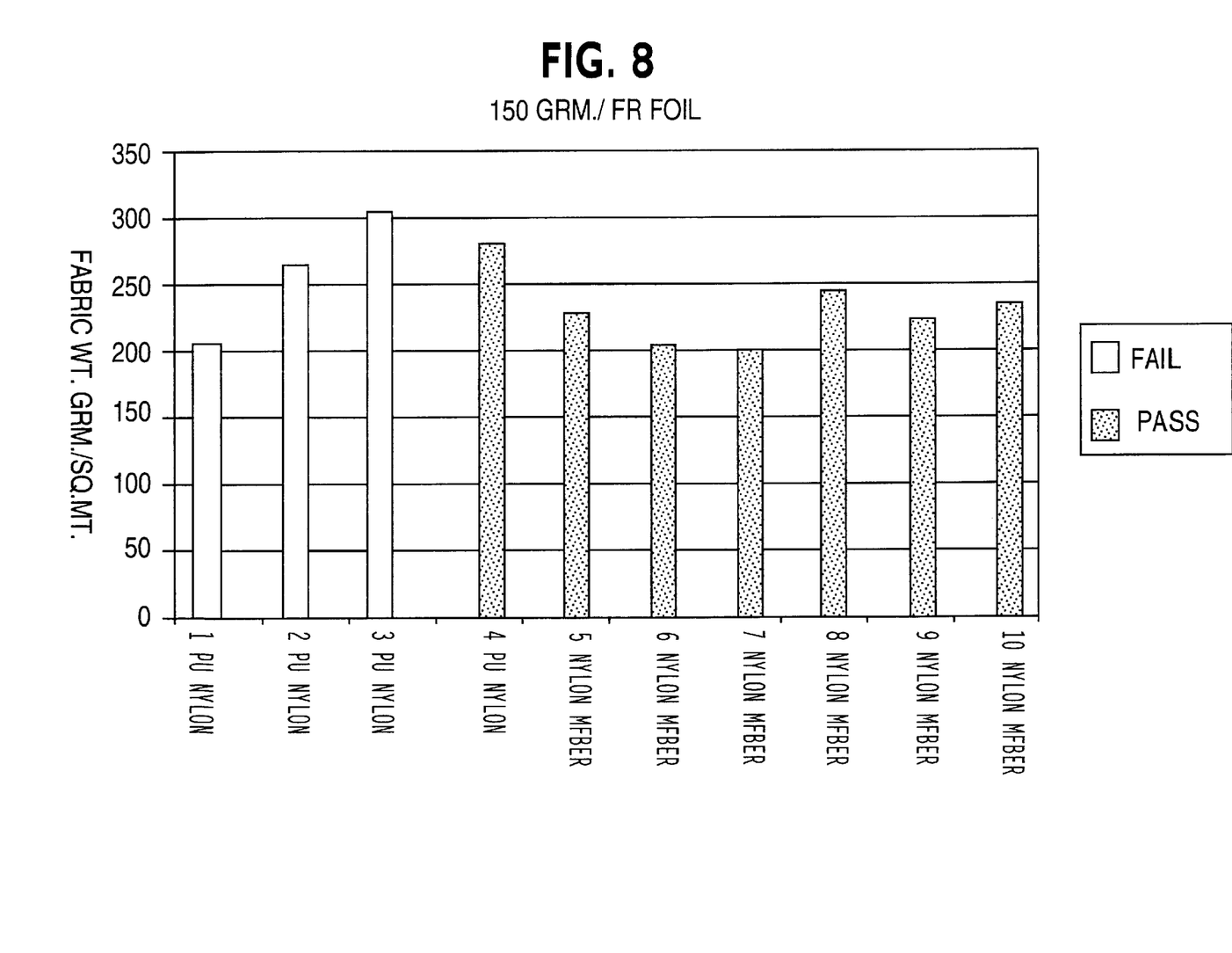
Figure 9:
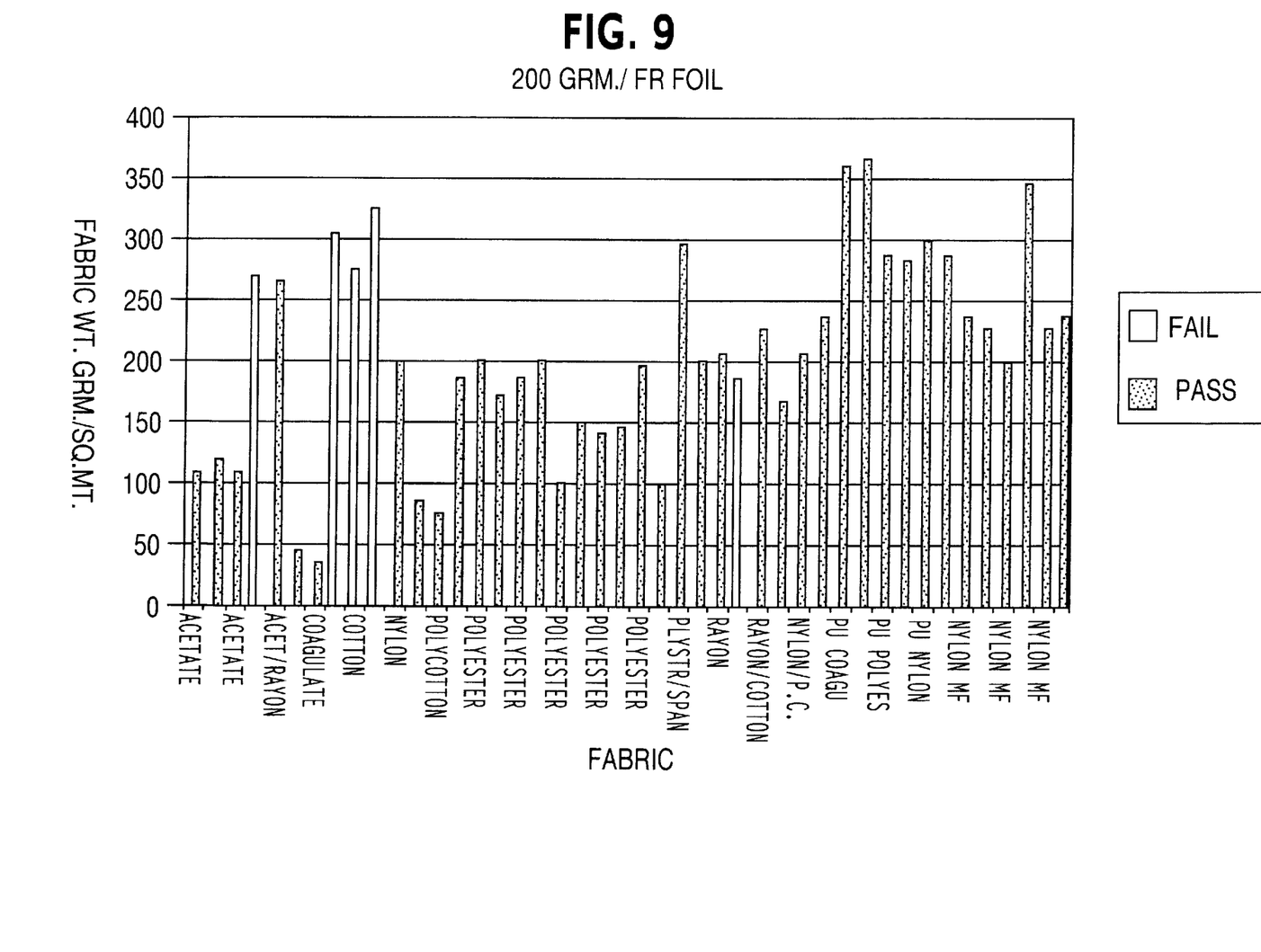

FIGS. 7–9 show the results of the different foil weights on particular fabrics. As can be seen the above results, the applied foil is particularly advantageous when applied to acetate, nylon and polyester fabrics. This particular fire retardant foil of example 3 is not generally suitable for application to cotton fabrics but those of skill in the art could prepare a suitable foil that would work on cotton materials.

It will be apparent to those skilled in the art that various modifications and variations can be made to the compositions and processes of this invention. Thus, it is intended that the present invention cover such modifications and variations, provided they come within the scope of the appended claim and their equivalents.

The disclosure of all publications cited above are expressly incorporated herein by reference in their entireties to the same extent as if each were incorporated by reference individually.

Unless indicated otherwise, as used herein and in the following claim, the use of the articles "a", "an", "the", and the like shall mean at least one of the article or object that follows.

What is claimed is:

1. A fire retardant composition adapted for adhesion to a flexible substrate comprising a cured film, wherein said film is cured prior to adhering to said flexible substrate and wherein said film is formed from a film-forming composition comprising a curable resin and at least one fire retardant, the fire retardant being included in an amount from about 5 to about 95 weight percent based on the weight of the cured film, and wherein when said film is adhered to said flexible substrate, the film substantially does not alter the hand of the flexible substrate.

2. A composition according to claim 1 that is elongated and in the form of a roll.

3. A composition according to claim 1, wherein said film has a 100% modulus in an uncrosslinked state between 20 and 5000 psi.

4. A composition according to claim 1, wherein said resin is an acrylic polymer.

5. A composition according to claim 1, wherein said resin is a chloroprene polymer.

6. A composition according to claim 1, wherein when said fire retardant composition is applied to a flexible substrate, the stiffness of the substrate does not change by more than 50% when subjected ASTM D747 "Stiffness of Plastics", than the stiffness of the underlying substrate prior to application of said film.

7. A composition according to claim 6, wherein said percentage is not more than 35%.

8. A composition according to claim 6, wherein said percentage is not more than 5%.

9. A composition according to claim 1, wherein said film in an uncured state has a viscosity from 5000 to 100,000 cps.

10. A composition according to claim 1, wherein said film has a glass transition temperature from –30 to 40 degrees C.

11. A laminate comprising:
   a film according to claim 1; and
   a flexible substrate.

12. A laminate comprising:
   a film according to claim 1; and
   a release backing releasibly adhered to said film.

13. A laminate comprising:
   a film according to claim 1; and
   an adhesive bonded to said film.

14. A laminate according to claim 13, wherein said adhesive is a discontinuous web adhesive.

15. A process for preparing a fire retardant film, comprising applying a polymeric film forming composition onto a release backing, curing said film forming composition, and separating the resulting film from the release backing,
   wherein said film-forming composition comprises a curable resin and at least one fire retardant in an amount from about 5 to about 95% by weight based on the total weight of the film, and wherein when said film is adhered to a flexible substrate, the film substantially does not alter the hand of the flexible substrate.

16. A process according to claim 15, further comprising forming said resulting film into a sheet or roll.

17. A process for preparing a fire retardant film, comprising applying a polymeric film forming composition onto a continuous belt, curing the film-forming composition to form a film, and separating the cured film from the continuous belt,
   wherein said film-forming composition comprises a curable resin and at least one fire retardant in an amount from about 5 to about 95% by weight based on the total weight of solids in the cured film, and wherein when said film is adhered to a flexible substrate, the film substantially does not alter the hand of the flexible substrate.

18. A process according to claim 16, wherein said cured film has a 100% modulus between 20 and 5000 psi.

19. A process according to claim 16, wherein said resin is an acrylic polymer.

20. A process according to claim 16, wherein said resin is chloroprene.

21. A process for preparing a laminate, comprising applying a polymeric film forming composition onto a release backing, and curing said film forming composition, wherein said film-forming composition comprises a curable resin and at least one fire retardant in an amount from about 5 to about 95 weight percent based on the total weight of solids in the cured film, and wherein when said film is adhered to a flexible substrate, the film substantially does not alter the hand of the flexible substrate.

22. A process according to claim 21, wherein said cured film has a 100% modulus 20 and 5000 psi.

23. A process according to claim 16, wherein said resin is an acrylic polymer.

24. A process according to claim 16, wherein said resin is chloroprene.

25. A process according to claim 16, wherein said film is formed using a knife-over-roll process.

26. A process according to claim 16, wherein said film is formed using reverse roll coating.

27. A process according to claim 16, further comprising the step of applying an adhesive to the fire retardant film.

28. A process according to claim 27, wherein said adhesive is a discontinuous web adhesive.

29. A process according to claim 21, further comprising the step of bonding said laminate to a substrate.

30. A process according to claim 17–29, further comprising the step of forming the cured film into a roll or sheet.

31. An article comprising:
a flexible substrate; and
a film adhered to said substrate, said film being formed from a film-forming composition comprising a curable resin and at least one fire retardant, wherein said film is cured prior to adhering to said flexible substrate, and wherein when said film is adhered to said flexible substrate, the stiffness of the substrate does not change by more than 50% when subjected to ASTM D747 "Stiffness of Plastics", than the stiffness of the underlying substrate prior to adherence of said film.

32. A composition according to claim 1, wherein when said fire retardant composition is applied to a flexible substrate, the stiffness of the substrate does not change by more than 50% when subjected to General Motors Test GM9664P, than the stiffness of the underlying substrate prior to application of said film.

33. An article comprising:
a flexible substrate; and
a film adhered to said substrate, said film being formed from a film-forming composition comprising a curable resin and at least one fire retardant, wherein said film is cured prior to adhering to said flexible substrate, and wherein when said film is adhered to said flexible substrate, the stiffness of the substrate does not change by more than 50% when subjected to General Motors Test GM9664P, than the stiffness of the underlying substrate prior to adherence of said film.

34. A composition as claimed in claim 1, wherein said cured film is capable of meeting the requirements of a flammability test selected from the group consisting of IMO 653, FAR 25.853(a), MVSS302, NFPA 701, Nord Arch and BS 5852.

35. An article according to claim 31, wherein said substrate has a decorative side and a non-decorative side and said film is adhered to the non-decorative side of said flexible substrate.

36. An article according to claim 35, wherein said film is adhered to only the non-decorative side of said flexible substrate.

37. A process for imparting flame retardance to a flammable article having a decorative side and a non-decorative side comprising the steps of:
adhering a cured flame retardant film to the non-decorative side of said article,
wherein when said film is adhered to a flexible substrate, the film substantially does not alter the hand of the flexible substrate.

38. A process according to claim 37, wherein the article is a flexible substrate.

39. A process according to claim 37, wherein the flame retardant film comprises a film-forming composition comprising a curable resin and at least one fire retardant, the fire retardant being included in an amount from about 5 to about 95 weight percent based on the weight of the cured film.

40. A process according to claim 37, wherein the step of adhering comprises adhesively bonding.

41. A process according to claim 37, wherein the cured flame retardant film is adhered to only the non-decorative side of said article.

42. A process according to claim 21, further comprising curing the composition so that it is releasable.

43. An article according to claim 35, wherein the flexible substrate comprises a fabric, a textile, or a natural or synthetic leather.

44. A process according to claim 37, wherein the flexible substrate comprises a fabric, a textile, or a natural or synthetic leather.

* * * * *